US012159328B2

(12) United States Patent
Montazeri et al.

(10) Patent No.: US 12,159,328 B2
(45) Date of Patent: *Dec. 3, 2024

(54) SYSTEMS AND METHODS TO COMPUTE THE APPEARANCE OF WOVEN AND KNITTED TEXTILES AT THE PLY-LEVEL

(71) Applicant: LUXION, INC., Costa Mesa, CA (US)

(72) Inventors: Zahra Montazeri, Irvine, CA (US); Søren Gammelmark, Stavtrup (DK); Shuang Zhao, Irvine, CA (US); Henrik Wann Jensen, Del Mar, CA (US)

(73) Assignee: Luxion, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,647

(22) Filed: Jul. 26, 2023

(65) Prior Publication Data

US 2023/0368437 A1    Nov. 16, 2023

Related U.S. Application Data

(63) Continuation of application No. 17/357,747, filed on Jun. 24, 2021, now Pat. No. 11,721,047, which is a
(Continued)

(51) Int. Cl.
*G06T 11/00*    (2006.01)
*G06F 30/30*    (2020.01)
(Continued)

(52) U.S. Cl.
CPC ............ *G06T 11/001* (2013.01); *G06F 30/30* (2020.01); *G06T 15/50* (2013.01); *G06T 19/20* (2013.01);
(Continued)

(58) Field of Classification Search
CPC ....... G06T 11/001; G06T 15/50; G06T 19/20; G06T 2210/16; G06T 2200/04;
(Continued)

(56) References Cited

U.S. PATENT DOCUMENTS 5,016,183 A    5/1991 Shyong
5,255,352 A    10/1993 Falk
(Continued)

FOREIGN PATENT DOCUMENTS

EP    3223176 A1 *  9/2017    ............. G06F 17/12

OTHER PUBLICATIONS

Adabala, Neeharika, Nadia Magnenat-Thalmann, and Guangzheng Fei. "Real-time rendering of woven clothes." In Proceedings of the ACM symposium on Virtual reality software and technology, pp. 41-47. 2003. (Year: 2003).
(Continued)

*Primary Examiner* — King Y Poon
*Assistant Examiner* — Vincent Peren
(74) *Attorney, Agent, or Firm* — Esplin & Associates, PC

(57) ABSTRACT

Systems and methods configured to determine appearance of woven and knitted textiles at the ply-level are presented herein. Exemplary embodiments may: obtain an input pattern of a textile, the input pattern comprising a two-dimensional weave pattern; obtain appearance information, the appearance information including one or more of color, transparency, or roughness; determine ply curve geometry based on ply-level fiber details making up individual plys; generate an image simulating an appearance of the textile based on the two-dimensional weave pattern, the appearance information, and the ply curve geometry so that the image simulating the appearance of the textile takes into account the ply-level fiber details; and/or perform other operations.

20 Claims, 9 Drawing Sheets

Related U.S. Application Data continuation of application No. 16/897,610, filed on Jun. 10, 2020, now Pat. No. 11,049,291, which is a continuation-in-part of application No. 16/563,871, filed on Sep. 7, 2019, now abandoned.

(51) Int. Cl.
  *G06T 15/50* (2011.01)
  *G06T 19/20* (2011.01)
  *G06F 113/12* (2020.01)

(52) U.S. Cl.
  CPC ...... *G06F 2113/12* (2020.01); *G06T 2200/24* (2013.01); *G06T 2210/16* (2013.01)

(58) Field of Classification Search
  CPC . G06T 2200/24; G06T 2200/28; G06F 30/20; G06F 2113/12
  See application file for complete search history.

(56) References Cited

U.S. PATENT DOCUMENTS

| | | | |
|---|---|---|---|
| 9,202,291 | B1 | 12/2015 | Child |
| 11,049,291 | B1 | 6/2021 | Montazeri |
| 2003/0071812 | A1 | 4/2003 | Guo |
| 2006/0199167 | A1 | 9/2006 | Yang |
| 2010/0110462 | A1 | 5/2010 | Arai |
| 2011/0148871 | A1 | 6/2011 | Kim |
| 2011/0158505 | A1 | 6/2011 | Sun |
| 2017/0337303 | A1 | 11/2017 | Cirio |
| 2018/0005413 | A1 | 1/2018 | Bala |
| 2020/0004893 | A1 | 1/2020 | Bernardon |
| 2021/0074057 | A1 | 3/2021 | Gammelmark |
| 2021/0256172 | A1* | 8/2021 | Castillo ............... G06T 19/00 |
| 2021/0319598 | A1 | 10/2021 | Montazeri |

OTHER PUBLICATIONS

Aliaga, C., Castillo, C., Gutierrez, D., Otaduy, M.A., Lopez-Moreno, J., & Jarabo, A. (Jul. 2017). An appearance model for textile fibers. In Computer Graphics Forum (vol. 36, No. 4, pp. 35-45).

Ashikmin, Michael, Simon Premoie, and Peter Shirley. "A microfacet-based BRDF generator." In Proceedings of the 27th annual conference on Computer graphics and interactive techniques, pp. 65-74. 2000. (Year: 2000).

Grolier, E., Rau, R. T., & Strar..er, W. (Jun. 1996). Modeling textiles as three dimensional textures. In Eurographics Workshop on Rendering Techniques (pp. 205-214). Springer, Vienna.

Khungurn, P., Schroeder, D., Zhao, S., Bala, K., & Marschner, S. (2015). Matching Real Fabrics with Micro-Appearance Models. ACM Trans. Graph., 35(1), 1-1.

Irawan, P., & Marschner, S. (2012). Specular reflection from woven cloth. ACM Transactions on Graphics (TOG), 31(1), 1-20.

Luan, F., Zhao, S., & Bala, K. (Jul. 2017). Fiber-Level On-the-Fly Procedural Textiles. In Computer Graphics Forum (vol. 36, No. 4, pp. 123-135).

Sadeghi, I., Bisker, 0., De Deken, J., & Jensen, H. W. (2013). A practical microcylinder appearance model for cloth rendering. ACM Transactions on Graphics (TOG), 32(2), 1-12.

Schroder, K., Klein, R., & Zinke, A. (Jun. 2011). A volumetric approach to predictive rendering of fabrics. In Computer Graphics Forum (vol. 30, No. 4, pp. 1277-1286). Oxford, UK: Blackwell Publishing Ltd.

Schroder, K., Zhao, S., & Zinke, A. (2012). Recent advances in physically-based appearance modeling of cloth. SIGGRAPH Asia 2012 Courses, 1-52.

Schroder, K., Zinke, A., & Klein, R. (2014). Image-based reverse engineering and visual prototyping of woven cloth. IEEE transactions on visualization and computer graphics, 21(2), 188-200.

Smith, Bryan, Roman Fedotov, Sang N. Le, Matthias Frei, Alex Latyshev, Luke Emrose, and Jean Pascal leBlanc. "Simulating woven fabrics with weave." In ACM SIGGRAPH 2018 Talks, pp. 1-2. 2018. (Year: 2018).

Xu, C., Wang, R., Zhao, S., & Bao, H. (2019). Multi-Scale Hybrid Micro-Appearance Modeling and Realtime Rendering ofThin Fabrics. IEEE transactions on visualization and computer graphics.

Zhao, S., Luan, F., & Bala, K. (2016). Fitting procedural yarn models for realistic cloth rendering. ACM Transactions on Graphics ( TOG), 35(4), 1-11.

* cited by examiner $$L_o(x,\vec{\omega}) = L_e(x,\vec{\omega}) + \int_\Omega f_r(x,\vec{\omega}',\vec{\omega}) L_i(x,\vec{\omega}')(\vec{\omega}' \cdot \vec{n}) d\vec{\omega}'$$

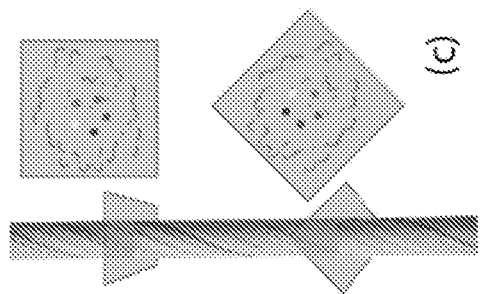
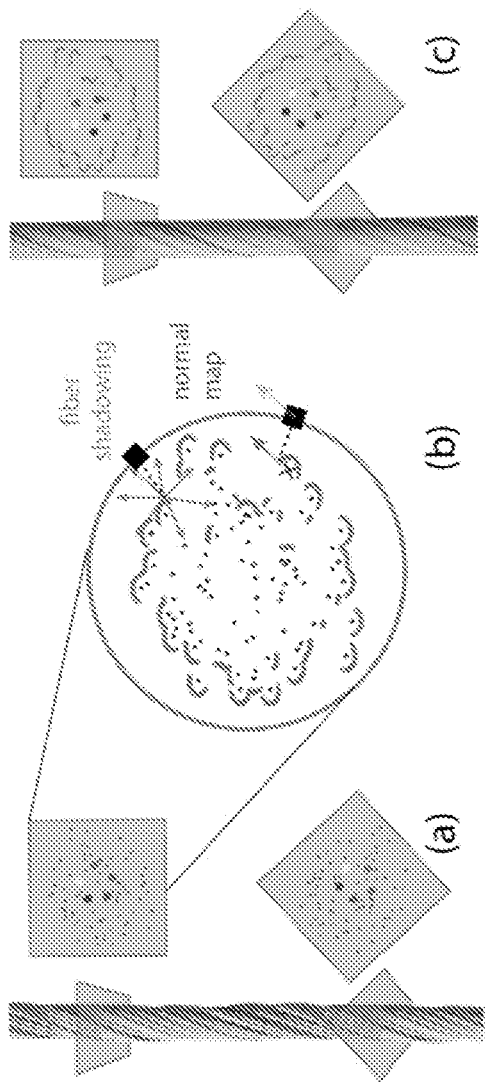
Figure 9a  Figure 9b  Figure 9c

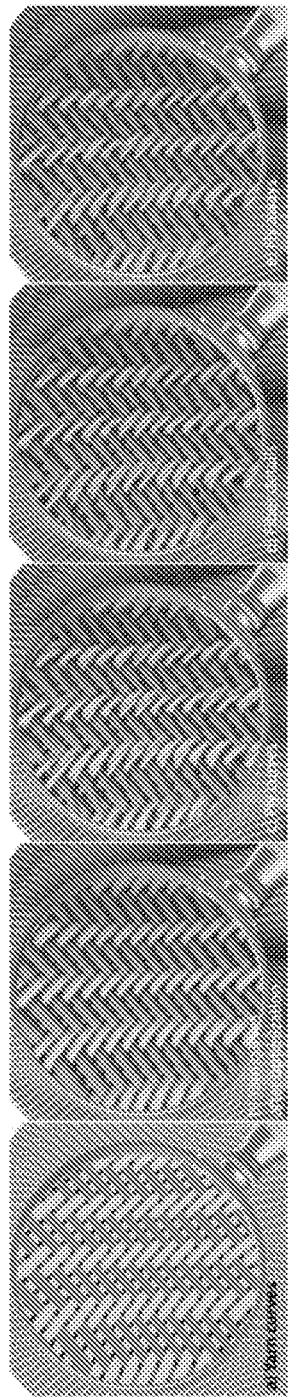
Figure 10a  Figure 10b  Figure 10c  Figure 10d  Figure 10e
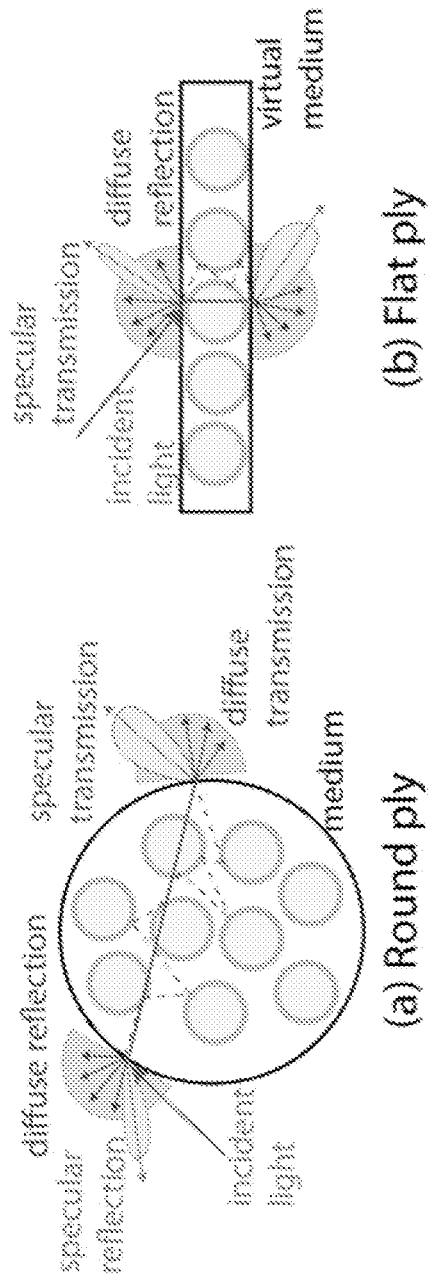
(a) Round ply
Figure 11a
(b) Flat ply
Figure 11b

SYSTEMS AND METHODS TO COMPUTE THE APPEARANCE OF WOVEN AND KNITTED TEXTILES AT THE PLY-LEVEL

FIELD

The present invention relates generally to systems and methods to compute appearance of woven and knitted textiles at the ply-level, and more specifically to create images from three-dimensional (3D) models by modeling the geometric variations and lighting of objects and scenes including woven and knitted fabrics, such as clothing.

BACKGROUND

One of the long standing challenges in computer generated imagery, as also referred to as "CGI", is the creation of output images including weave patterns of fabrics, where fabrics includes items with threads composed of fibers. Fabric may include items such as clothes, blankets, curtains, sheets, and/or other items.

CGI may include the generation of static and/or dynamic images. To generate CGI images of an object, CGI may require detailed descriptions of a scene containing the object, including one or more of a description of the geometry in the scene in the form of a 3D model, a description of the materials assigned to the geometry in the scene, a description of the lighting in the scene, and/or other information.

Conventionally, descriptions of a scene may use a Bidirectional Reflectance Distribution Function (BRDF) model to represent the appearance of the 3D elements in the scene. The BRDF model mathematically describes the distribution of reflected light given an incoming lighting distribution. Combined with an algorithm such as ray tracing or rasterization it is possible to create images of the 3D model.

Sometimes, a more comprehensive appearance model may be used, called a Spatially Varying (SV) BRDF model. The SVBRDF model accounts for variations across the surfaces of a 3D surface. This variation is typically represented using an image map (such as a photograph of wood grain used to represent a wood surface).

To create an image, a user may be responsible for modeling all the relevant geometry of an object or scene, and then specifying the BRDF or SVBRDF models needed to represent the appearances of the given objects in the scene. Both of the appearance models, BRDF and SVBRDF, typically rely on microfacet distributions that describe how tiny invisible variations in a surface structure of an object contribute to the appearance of the object's material.

For modeling many materials, especially smooth objects such as cars, wood tables, window glass, the BRDF and SVBRDF models can accurately represent the physical appearance. However, the BRDF and SVBRDF models fall short when modeling objects with micro detail that is too fine to represent in the 3D model but still affects the visible appearance. An example of an object with micro detail is fabric composed of threads visible to the human eye. These threads cast shadows and cause light variation on the micro level that is not captured accurately by the classic BRDF and SVBRDF models.

SUMMARY

Implementations presented herein describe systems and methods to compute the appearance of woven and knitted textiles at the ply-level. A user may input a 2-dimensional (2D) fabric weave pattern and/or other information into an appearance model, and the appearance model may simulate a three-dimensional (3D) appearance of the fabric weave pattern. One or more implementations presented herein may provide advantages over existing solutions, described and/or made apparent herein.

An existing approach to modeling textiles may be to use a detailed volumetric representation produced for example with a Computed Tomography (CT) scanner. The CT scanner can capture the fiber detail inside the textile and can provide a highly detailed representation of a small piece of textile. However, this approach may fail to represent complete pieces of clothing due to the amount of memory needed for the volumetric description. Furthermore, the volumetric description relies of radiative transfer of light to compute how light interacts with the textile. Since the volume does not have a proper surface definition this approach suffers from the inability to simulation light reflecting of the surface. As such these methods rely on radiative transfer models that are highly backscattering and therefore fail to capture light shining through clothing. The volumetric approaches fail to simulate both reflection and transmission through clothing.

Another approach to modeling textiles may be to simulate every fiber within the textile. Each yarn is composed of often a hundred fibers, and modeling each fiber requires a tedious simulation. Given the immense amount of detail represented by the fibers, this approach may be limited to small pieces of textiles as the number of fibers needed require too much storage. For the simulated fiber-based textile, the light scattering may be described by a BCSDF model that describes how light is scattered by each fiber curve. The combination of a large number of fibers with a BCSDF model is very difficult to control as the placement of each fiber as well as the parameters for the BCSDF model influence the overall appearance, and existing approaches have not been able to handle both reflection and transmission of lighting for this reason.

Since an appearance model may only takes a smooth surface as input, but creates a 3D appearance using the weave pattern, it is often referred to as a 2.5D appearance model. While the appearance model may not comprise a 3D model, but instead may comprise a 2D model, the appearance model may have enhanced capabilities that makes the output appear to be 3D, and thus may be called a 2.5D appearance model.

The output of the 2.5D appearance model may include one or more images. The outputted images of the 2.5D appearance model may include detailed information of a geometric surface, called a meso surface, created by the 2D weave pattern inputted into the 2.5D appearance model. The 2.5D appearance model enables the accurate computation of light reflected by the weave pattern and takes into account shadows and reflected light from the threads and fibers represented by the weave pattern. The output further includes flyaway fibers, which may comprise fibers breaking out from the threads that they are a part of. The input 2D weave pattern of the fabric may be editable by a user.

The present invention relates generally to a method, system, and apparatus for computing the appearance of weave patterns used in various forms of fabrics. The system enables a much more accurate visual simulation that accounts for geometric surface detail, also referred to as geometric surface variations or geometric variations, without the cost of explicitly constructing this detail.

One or more of implementations of the present invention propose a new model for representing weave patterns. This new model, which may be called a 2.5D appearance model, enables a simulation of the appearance of fabrics using only a smooth geometric surface. The 2.5D appearance model uniquely accounts for the appearance of the surface detail including shadows cast by threads onto other threads, called self-shadowing. To account for the appearance of the surface detail, the 2.5D appearance model leverages the fact that weave patterns are repetitive.

The 2.5D appearance model relies on a computation of various properties within the weave pattern. These computed properties include a two-dimensional distribution of heights, a two-dimensional distribution of tangents, and a two-dimensional distribution of normals. These heights, tangents, and normals reflect the structure of the actual surface of the fabric.

The 2.5D appearance model uniquely simulates how light is scattered by the individual fibers making up each thread, a novel feature. Conventional computer graphics algorithms, unlike the 2.5D appearance model, cannot compute self-shadowing on flat surfaces. These conventional algorithms can only account for thread shadows by creating a complete volumetric representation of the fabric, which requires an impractical amount of storage and has not been used in practice.

Additionally, the 2.5D appearance model works with unique 2D weave pattern inputs, which may be entered manually and edited by a user. Further, the 2.5D appearance model accounts for the inputted 2D weave pattern's weaving structure, such as the ply count for each thread.

Further, the system has unique outputs including modeling flyaway fibers. Flyaway fibers are tiny fibers breaking out from the threads that they are a part of. Therefore, these tiny flyaway fibers are aligned with the threads in the weave pattern and the flyaway fibers naturally inherit the color, and part of their orientation, from the underlying thread distribution. The addition of flyaway fibers to an outputted image adds realism to the weave pattern simulation.

An advantage of the invention is that the system simplifies the model by avoiding having to model every thread and fiber for an entire fabric object. The system accomplishes this simplicity by leveraging the inherent structure and repeatability of the pattern of the object, such that the system models weave patterns in a natural way.

This simplicity means that in addition to a user providing the inputs, a lightweight 3D CAD model can be used to input a 2D weave pattern into the new 2.5D appearance model. The lightweight 3D CAD model is used to create 3D CAD surface that the 2.5D appearance model is outputted on to. Using the lightweight 3D CAD model, the new appearance model will compute the appearance of the 2D weave pattern while accounting for the appearance of threads and fibers as well as the local occlusion of threads. By using a completely smooth underlying lightweight 3D model as the input, this is a novel way of simulating a 3D appearance.

The lightweight 3D CAD model is considered smooth, or completely smooth, because the lightweight 3D CAD model only shows the overall surface an object. The smooth lightweight 3D CAD model does not show the thread and fiber detail. For example, when the object in an image to be outputted is a piece of clothing, the smooth lightweight 3D CAD model of the clothing does not show the thread and fiber detail of the clothing. The thread and fiber detail are completely missing from the smooth lightweight CAD model. The smooth lightweight 3D CAD model only shows the overall surface as if the cloth of the clothing is made of pieces of paper put together.

The foregoing, and other features and advantages of the invention, will be apparent from the following, more particular description of the preferred embodiments of the invention, the accompanying drawings, and the claims.

One or more implementations described herein may be facilitated by a user inputting, into an appearance model, one or more of a 2 dimensional (2D) or 3 dimensional (3D) knit pattern of a textile, a smooth surface representation of the textile, parameters for an appearance model, and/or other information. An output may include images of the textile based on a simulation of how light reflects of each point on the textile surface. The simulation may include one or more of light reflected by the surface, light transmitted through the surface, and/or other features. The simulation may take into account fiber-level appearance details without explicitly modeling each fiber. The appearance model may account for self-shadowing and/or inter reflection of light between the yarns and/or the fibers. The entire textile including geometry and/or appearance may be edited dynamically by the user which may be fast enough to provide interactive feedback.

One or more implementations of the systems and methods presented herein may be configured to compute the appearance of woven and knitted textiles at the ply-level. The ply level may mean that each yarn may be represented using one or more yarn curves. For example, an N-ply yarn may use N curves (e.g., a 2-ply yarn may use two curves; a 3-ply yarn may use three curves; etc.). The systems and methods presented herein may enable a significantly more accurate visual simulation of textiles that may be able to simulate both reflection of light by textiles as well as transmission of light through textiles. Furthermore, the systems and methods may only require a representation of the ply level geometry (e.g., ply curve geometry) in the textiles and may therefore be used to represent relatively large pieces of clothing.

One or more implementations of the present invention comprise an appearance model for representing yarn curves making up the textiles. The appearance model, which may be referred to herein as a "ply appearance model", may combine appearance from the fibers within each ply curve without having to explicitly model each fiber. To account for the fiber detail the appearance model may use a compact 1D representation of an effect of shadows and/or surface orientation on the ply curve due to the fibers that it is composed of.

An individual ply curve may be enhanced with information (e.g., fiber details) from a pre-computed fiber simulation. The fiber simulation may be performed for one or more threads. The fiber simulation may comprise one or more of the surface orientation (normals) of the fibers, the self-shadowing of an individual thread due to other fibers within the thread, and/or other information. One or more of these pre-computed properties may be represented compactly as 1D texture maps that leverage the fact that the fibers may be rotationally invariant along the length of the ply thread.

The ply appearance model may utilize a Bidirectional Curve Scattering Distribution Function (BCSDF) to simulate a reflection and/or transmission of light from each ply thread. The BCSDF may use a microfacet based roughness model for glossy reflections and/or transmissions. The ply appearance model may use index of refraction and/or Fresnel terms to control an amount of reflection and/or transmission. The ply appearance model may use diffuse reflection and/or transmission to represent multiple scattering of light within each ply thread.

By way of non-limiting illustration, an implementation of a system configured to determine appearance of woven and knitted textiles at the ply-level may comprise one or more physical processors configured by machine-readable instructions. Executing the machine-readable instructions may cause the one or more physical processors to facilitate determining appearance of woven and knitted textiles at the ply-level. The machine-readable instructions may include one or more computer program components. Individual computer program components may be configured to obtain and/or determine information to be provided as input into an appearance model. The output of the appearance model may comprise one or more images simulating an appearance of a textile.

A computer program component may be configured to obtain an input pattern of a textile. The input pattern may comprise a two-dimensional weave pattern and/or other patterns.

A computer program component may be configured to obtain appearance information for the textile and/or other information. The appearance information may include one or more of color, transparency, roughness, and/or other information.

A computer program component may be configured to determine ply curve geometry. The ply curve geometry may be determined based on ply-level fiber details making up individual plys of the textile and/or other information.

A computer program component may be configured to generate an image simulating an appearance of the textile based on one or more of the two-dimensional weave pattern, the appearance information, the ply curve geometry, and/or other information. The image simulating the appearance of the textile may be generated so that the image takes into account the ply-level fiber details.

The ply appearance model may uniquely simulate clothing at the ply level while accounting for details at the fiber level. The conventional algorithms either fail to capture this detail or they are so detailed that they do not scale to real cloth sample sizes due to the significant computational resources needed to store a full fiber representation. Furthermore, the ply appearance model may be the first to demonstrate the ability to accurately simulate actual photographs of reflections and/or transmissions in actual physical cloth samples.

Additionally, the ply appearance model may be relatively more computationally efficient and may allow the user to provide a 2D weave pattern or a 2D knit pattern that may be used to create a ply curve geometric representation of textiles. The pattern may be edited interactively by the user and/or the user may use pre-defined weave or knit patterns. The user may also edit parameters such as one or more of ply count, ply diameter, and/or other parameters, to control the geometric layout.

Furthermore, one or more implementations described herein may add optional runaway fibers aligned with each ply curve. Runaway fibers may represent individual fiber curves that are sticking out from each ply thread. The fibers may be aligned with the ply curves and add a softness to the overall appearance of the textile.

An advantage of the present disclosure is that the systems and methods simplify, and make practical, the modeling of textiles that shows fiber level details without having to model each fiber in the textile. This may be achieved, at least in part, by using simpler ply-level threads for each yarn curve and augmenting each ply thread with information from the fibers including one or more of shadows, surface orientation, and/or other features. In some implementations, the modeling may happen automatically without user intervention. In some implementations, the user may specify one or more of the woven or knitted pattern, thread attributes such as ply count and diameter, and/or other values of appearance parameters. Appearance parameters may include one or more of color, specular reflection properties, and/or other appearance characteristics.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 9a illustrate how a ply-level description may be enhanced with information from a fiber level geometry.

FIG. 9b illustrate how a ply-level description may be enhanced with information from a fiber level geometry.

FIG. 9c illustrate how a ply-level description may be enhanced with information from a fiber level geometry.

FIG. 10a illustrates how adding ply-level geometry with curve enhancement, fiber detail, and/or flyaway curves increasingly enhances appearance of a textile.

FIG. 10b illustrates how adding ply-level geometry with curve enhancement, fiber detail, and/or flyaway curves increasingly enhances appearance of a textile.

FIG. 10c illustrates how adding ply-level geometry with curve enhancement, fiber detail, and/or flyaway curves increasingly enhances appearance of a textile.

FIG. 10d illustrates how adding ply-level geometry with curve enhancement, fiber detail, and/or flyaway curves increasingly enhances appearance of a textile.

FIG. 10e illustrates how adding ply-level geometry with curve enhancement, fiber detail, and/or flyaway curves increasingly enhances appearance of a textile.

FIG. 11a illustrates how light interacts with a round ply yarn.

FIG. 11b illustrates how light interacts with a flat ply yarn

DETAILED DESCRIPTION

Before the present composition, methods, and methodologies are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

The present disclosure described systems and methods configured to take as an input a 2D weave pattern containing information about the organization of the threads within the weave pattern, and enter the 2D weave pattern into a highly detailed 2.5D appearance model capable of outputting a simulation of a wide range of fabrics from different weave patterns. The appearance model is called a 2.5D model herein because the appearance model receives as the input a smooth 2D surface, but creates as the output an image that gives a 3D appearance of the input. The highly detailed 2.5D appearance model computes a meso surface corresponding to the actual weave pattern geometry and uses the meso surface structure to compute the 3D appearance of the inputted 2D weave pattern. The 2.5D appearance model goes beyond traditional methods that use 2D images to create the appearance, and the appearance model is much more efficient than full volumetric methods that create a vast amount of geometric information.

The system may compute shadowing of threads by tracing a ray through a virtual meso surface representation (this can be a height field or another geometric representation in the space of the weave pattern), shadowing of threads may also be computed using a height value from a height field map, or the shadows can be pre-computed and represented using some functional basis such as spherical harmonics. The input weave pattern may include information about the threads ply value and the color of the weave pattern may be controlled using a texture applied to the 2.5D appearance model. The 2.5D appearance model may be modified using meso surface information. The threads can be flat, and the threads can have eccentricity, which is a curved shaped.

Figure 1:
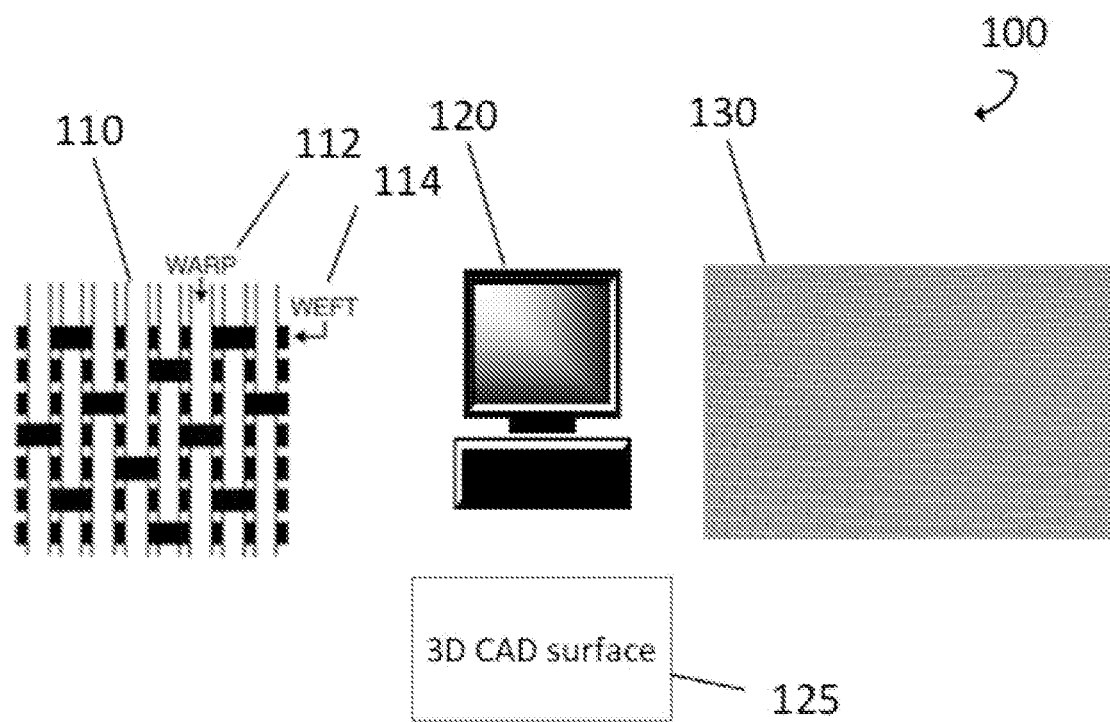
FIG. 1 illustrates a system for editing and computing the appearance of a weave pattern according to one embodiment of the invention.

FIG. 1 illustrates a system 100 for specifying and computing the appearance of a weave pattern 110 according to one embodiment of the invention. The system 100 includes an input weave pattern 110, an appearance model executed by a computer 120, a 3D CAD surface 125, and a simulation output 130.

The weave pattern 110 is a 2D weave pattern that is input into the system 100. The weave pattern may be input by a user or by computer. The weave pattern 110 describes the layout of threads, including the warp threads or yarns 112 and the weft thread(s) or yarn(s) 114 that form a fabric. A warp thread 112 extends vertically through a weave pattern, with the edges of the warp threads 112 typically being held in stationary tension using a frame or device. A weft thread 114 extends horizontally through the weave pattern, the weft thread 114 inserted over and under the warp threads 112.

The weave pattern 110 includes a thread layout and thread type. The thread layout includes when a thread is above and below other threads, the roughness of the surface of each fiber, and the specular properties. The thread type includes whether a thread is round or flat, the color of the thread, the transparency, and a ply count for the round threads. The system 100 uses the thread layout and thread type to compute the horizontal layout of the weave pattern 110, including the height at each location and the surface orientation (that is, the normal) of the thread or fiber at a specific location.

The weave pattern 110 allows a user to use the system 100, where the user either simply manually specifies the weave pattern 110 or the user or a CAD model inputs an already generated weave pattern.

For embodiments of this invention, the object is a fabric. A fabric is a cloth or other material produced by weaving together cotton, nylon, wool, silk, or other threads. Fabrics are composed of threads, and fibers spun into threads, where the threads are woven together in a pattern specific to the fabric type and appearance. Fabrics are used for making things such as clothes, blankets, curtains, cloth, and sheets, and as such, these things may be referred to as fabrics.

The 2.5D appearance model executed by the computer 120 (also referred to simply as an "apparatus", an "appearance model", and an "enhanced appearance model"), receives the weave pattern 110 as the input, and the 2.5D appearance model 120 computes the actual thread organization of a fabric. The system 100 allows a user to edit the weave pattern 110, including editing the warp and weft threads, prior to the 2.5D appearance model 120 computing a 3D appearance of the 2D weave pattern of a fabric.

While the 2.5D appearance model 120 is not a 3D model, it is a 2D model, the 2.5D appearance model 120 has enhanced capabilities that makes the output 130 appear to be 3D, and thus is called a 2.5D appearance model herein. Specifically, the appearance model 120 outputs the 3D appearance of 2D weave patterns 110, onto the 3D CAD surface 125. As such, the simulation output 130 looks like it is made of threads with a given inputted weave pattern 110, and the simulation output 130 responds to light as if it was created by a 3D model, even though the appearance model 120 is only 2D, but is called 2.5D herein because of these enhanced capabilities.

Additionally, the appearance model 120 is a called a 2.5D model herein because the appearance model 120 receives as the input a smooth 3D CAD surface, but creates as the output 130 an image that adds 3D appearance details to the input. A main purpose of the 2.5D appearance model 120 is to create the output 130, which is images of the weave pattern applied to the 3D CAD surface 125. More precisely, the goal of the 2.5D appearance model is to enable ray tracing of 3D CAD surfaces 125 using the 2.5D appearance model 120.

The 2.5D appearance model 120 takes the user inputted or generated weave pattern 110 and creates a 3D appearance of the weave pattern by computing how the threads would need to deform to go over and under each other.

There are two methods that can be used for the purpose of creating the 3D appearance. The first method of creating the 3D appearance is a simple geometric method that forces the thread geometry to bend whenever there is a change from over to under. This first method creates flat sections of threads with angle transitions in the area where a thread goes either under or over another thread. A second method of creating the 3D appearance uses a relaxation approach to compute the physical stretching of the thread to create a more natural thread layout based on the physics of the thread.

The 3D CAD surface 125 is user created, and represents a smooth surface for the weave pattern 110 to be added to in the output 130. As a result, the 3D CAD surface 125 is inputted into the system 100, and together with the 3D appearance of the weave pattern 110, forms the simulation output 130.

The 3D CAD surface 125 is smooth underlying geometry created by the user. For example, when the object is a t-shirt, the user may create a 3D model of a t-shirt representing the 3D CAD surface. This user created model of the t-shirt will represent the clothing, but it will not contain the very fine detail contained in a weave pattern, such as the threads making up the clothing. In this example, this user model can form the surface for the appearance model 120 to output on to. The 2.5D appearance model 120 can be applied to this surface 125, such that the simulation output 130 looks like it is made of threads with a given weave pattern. The simulation output 130 responds to light as if it were created by a 3D model, but since the appearance model 120 is only 2D, the appearance model 120 is called 2.5D herein as it has these enhanced capabilities.

While the 3D CAD surface 125 is an input to the system 100, the 3D CAD surface 125 is illustrated adjacent to the appearance model 120 to indicate in embodiments that the 3D CAD surface 125 is not an input to the appearance model 120. In other embodiments, the appearance model 120 receives the 3D CAD surface 125 from a lightweight 3D CAD model as an input, to output the weave pattern on to the 3D CAD surface 125.

The simulation output 130, also referred to herein as output 130 and image 130, illustrates an output of the system 100 including the 3D appearance of a fabric object represented by the 2D weave pattern 110. The simulation output 130 is a 2D image which has the appearance of being a 3D image due to shadows and threads. The simulation output 130 is a 3D appearance based on the input 2D weave pattern of the fabric, the 3D appearance applied to the 3D CAD surface 125 created by, a CAD model of the smooth underlying surface. The images can be any computer generated image, such as a static image or picture, a graphics interchange format (GIF) image, or a 3D animation or movie. The simulation output 130 captures light reflection information and geometric surface variations.

Light reflection information, captured by the simulation output 130, includes information about all light reflected by the appearance model 120. All light includes light reflections from a light source, light reflection between threads, and shadows caused by the threads. For a light source, the light reflection information includes a representation of a ray of light that is scattered off a fiber of the fabric. For reflection between threads, the 2.5D appearance model 120 can model light reflected between threads because the appearance model 120 uses a surface that is not flat, discussed with respect to a meso surface 520 in FIG. 5. If the surface was flat, then a reflected ray could not hit another part of the surface, but with the enhanced appearance model 120, the output 130 illustrates the light reflected between threads. In the case when the reflected light is shadows, the reflected light will be darker.

Geometric surface variation, captured by the simulation output 130, is a non-smooth surface created by the threads and fibers making up the cloth. Geometric surface variation is not present in the smooth 3D CAD surface 125 created by a user. The 2.5D appearance model 120 creates the geometric surface variations (e.g., threads, flyaway fibers, etc.) using only the weave pattern 110 including the additional appearance information entered by a user.

The simulation output 130 captures the geometric variations, also referred to as geometric surface variations, geometric detail, and meso surface detail, of the 2D input weave pattern, including threads that occlude each other. By contrast, traditional methods for imaging fabrics only represent the captured shading variation across a flat surface because they rely on scanning flat samples of the fabric. Additionally, with traditional methods, it is impossible to for a user to edit the weave pattern or the appearance of the threads, as this information is locked into the captured images. Further, conventional methods relying on scanning flat samples also fail to capture fine detail such as the appearance of flyaway fibers because this conventional approach models the weave pattern as an entire volume and as such this conventional approach is completely impractical and it does not allow for dynamic simulations where the underlying model is deformed.

Figure 2:
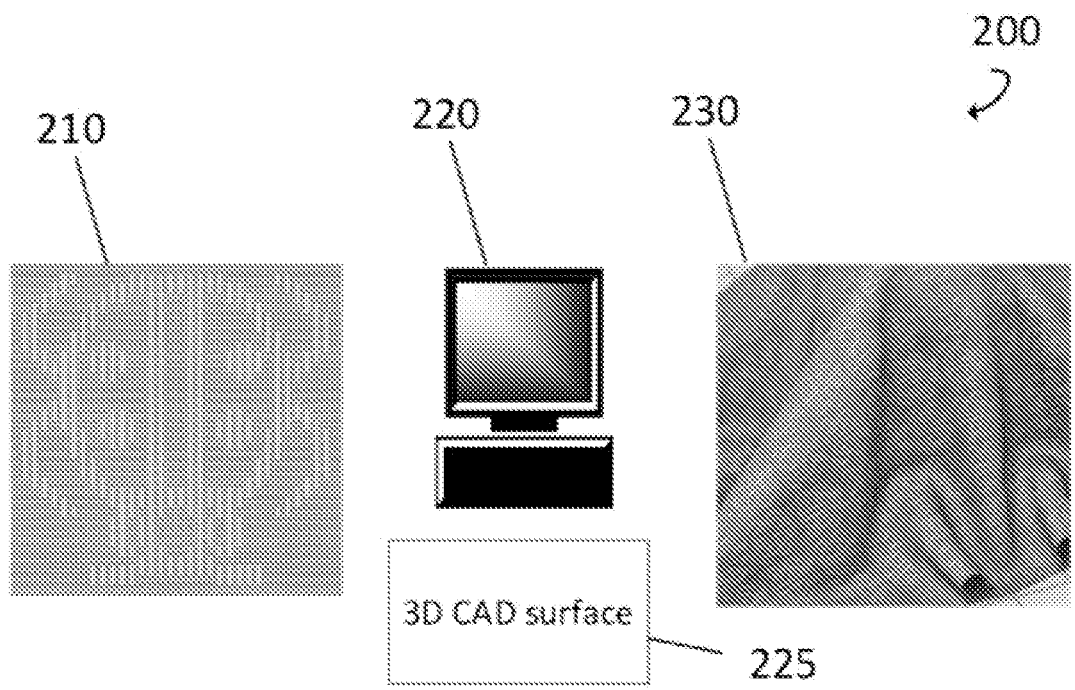
FIG. 2 illustrates a system for editing and computing the appearance of a weave pattern according to another embodiment of the invention.

FIG. 2 illustrates a system 200 for computing the appearance of a weave pattern 210 according to one embodiment of the invention. Like the system 100, the system 200 includes an object that is a fabric or a scene containing a fabric. Also, the weave pattern 210 is in 2D, the weave pattern 210 is editable by a user prior to computations, and the weave pattern 210 includes warp and weft threads. Although the system 200 is similar to the system 100, the system 200 uses a different design, different colors and sizes for the input weave pattern 210, and the system 200 produces a simulation output 230 which illustrates shadows. The simulation output 230 includes a 3D appearance of the 2D weave patterns 210 on a 3D CAD surface 225. Further, while the weave pattern 110 may have been automatically loaded onto the system 100 from an existing weave pattern, the weave pattern 210 may be created manually by a user using an interface of system 200.

The inputted weave pattern 210 defines a 2D pattern of threads. The weave pattern describes an over and under description of the threads as well as the color of the threads. For a user to manually create the weave pattern 210, the user specifies over and under patterns for the weft and warp threads. Furthermore, the user can specify thread appearance attributes such as color, surface roughness, thread eccentricity, and transparency.

The weave pattern 210 contains information about a fabric's thread appearance and thread structure. The thread's appearance includes a thread's color, surface roughness, reflectivity, etc. The thread's structure includes the organization of the threads, where the threads are organized into two basic components, warp and weft. Warp is the threads in the length wise direction and weft is the threads in the transverse direction that goes over and under warp threads to form a weave pattern. This thread structure and appearance are described by the weave pattern.

The 2.5D appearance model 220 can be the same as the 2.5D appearance model 120, where the weave pattern 210 is loaded into system 200 and a user can edit the weave pattern 210. The 2.5D appearance model 220 receives the inputted weave pattern 210, the user inputted CAD surface 225, and the 2.5D appearance model 220 computes a meso surface structure, which could be a 2D height field based on the computed layout of the threads. The 2.5D appearance model 220 takes as input a 3D CAD surface, where each surface point is identified by a 3D location, a 3D surface normal, and a 2D surface (texture) coordinate. The 2.5D appearance model 220 computes the light reflected, including the actual shading, from a point on a 3D surface by using the meso surface and the 2D weave pattern 210. The shadowing of threads may be computed by tracing a ray through a virtual height field from the inputted 2D weave pattern 210, the shadowing may be computed using the height value in the height field map, or the shadowing may be pre-computed and represented in a functional basis such as spherical harmonics. The 2.5D appearance model 220 uses maps of the weave pattern 210 to compute actual thread geometry, used for computing the occlusions causing shadows and affecting reflections.

In one embodiment, the 2.5D appearance model 220 includes a ray tracing algorithm to create image lighting with the geometry of the input weave pattern 210. The ray tracing algorithm uses rays of light to simulate the interaction of light with a given element in the scene. When a ray intersects the surface, the system 200 finds the location within the weave pattern 210 that corresponds to the particular surface location. At this location, the system 200 performs a visibility check, which is a check for the visibility of any light by tracing a ray towards each light.

The ray tracer's visibility check uses pre-computed meso surface information in the weave pattern to check locally if any occlusion is present. This visibility check can be done by tracing a ray through a 2D height field for which standard algorithms exist. Furthermore, a specular ray may be traced. The direction of this ray is determined from the height and the fiber orientation at the location combined with the appearance information including the specular color, transparency, and fiber surface roughness. The specular ray also uses the height information to check for any occlusion as the specular ray leaves the surface with the weave pattern.

Further, a ray is traced to compute indirect illumination. The direction of this ray is based on the height information and the fiber orientation as well as the appearance information. The ray tracer uses the meso surface to test for local occlusions. If a height field is used to represent the meso surface then the occlusion test that is applied for shadowing, specular reflections and indirect illumination can assume a locally flat surface to enable very fast ray tracing of the height field data.

The ray tracing algorithm creates an image of the fabric. The ray tracing algorithm works by intersecting the scene with a ray, that is, a geometric line. When the ray intersects a fabric surface, the system 200 computes the exact intersection with the underlying CAD model. This intersection location yields a 3D position, a 3D normal, and a 2D texture parameter. The 2D texture parameter is used to index into the weave pattern and the pre-computed geometry for this weave pattern. This indexing allows the ray to estimate the actual normal of the weave pattern fibers. This actual meso surface normal is used for shading.

To compute shading, the ray tracing algorithm traces one of more rays from the surface intersection location, that is, the 3D position found from the CAD model. To account for thread shadowing, the system 200 traces the ray through the weave pattern geometry (the meso structure) to account for any local blocking of the light. In addition, the system 200 can use the height to estimate an approximate fabric self-shadowing amount.

The 3D CAD surface 225 is user created, and represents a smooth surface for the weave pattern 210 to be added to. As a result, the 3D CAD surface 225 is inputted into the system 200, and together with the 3D appearance of the weave pattern 210, forms the simulation output 230.

The simulation output 230, like simulation output 130, illustrates an output of the system 200 including the 3D appearance of a fabric object represented by the 2D weave pattern 210 on the 3D CAD surface 225 inputted by a user. Here, the output 230 is an image. The outputted image 230 is an illustration of a blanket with multiple beetles woven thereon. The simulation output 230 reproduces the appearance of the fabric as if a physical sample had been created from the specific weave pattern 210.

Figure 3:
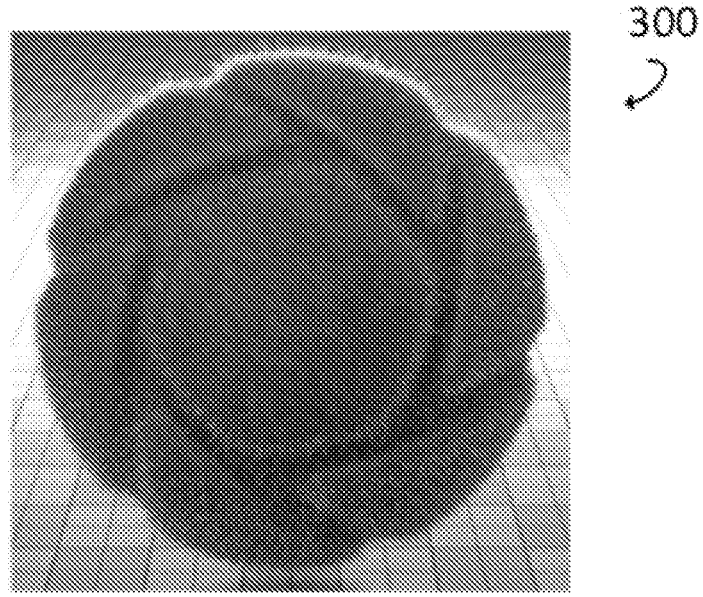
FIG. 3 illustrates an output of the system including flyaway fibers according to one embodiment of the invention.

FIG. 3 illustrates an output 300 of the system including flyaway fibers according to one embodiment of the invention. This image shows flyaway fibers visible along the contour of the surface of a sphere. The 2.5D appearance model can add these flyaway fibers using location information from the input 2D weave pattern.

Figure 4:
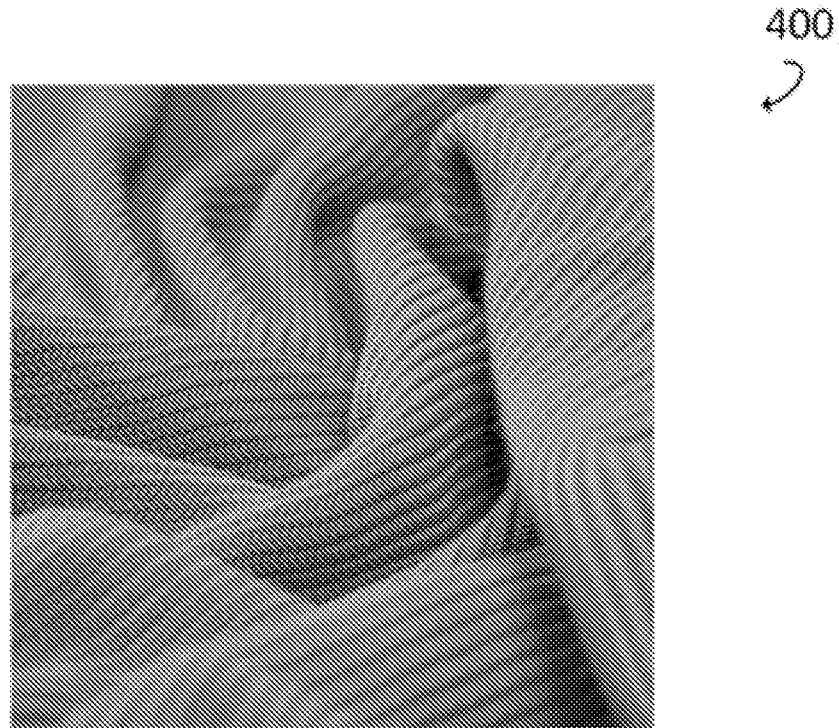
FIG. 4 illustrates an output of the system including the 3D appearance of a fabric object according to one embodiment of the invention.

FIG. 4 illustrates an output 400 of the system including the 3D appearance of a fabric object according to one embodiment of the invention. The output 400 is a 2D image which has 3D appearance details in the weave pattern due to shadows and threads. This simulation output 400 is created by initially receiving a 2D weave pattern and appearance information, then a 2.5D appearance model combines the weave pattern and appearance information along with a 3D geometric model of smooth fabric geometry. Appearance information including the specular color, transparency, and fiber surface roughness. With this information, the appearance model outputs a highly detailed image that accounts for shadowing from the threads without explicitly creating this detailed geometry.

Figure 5:
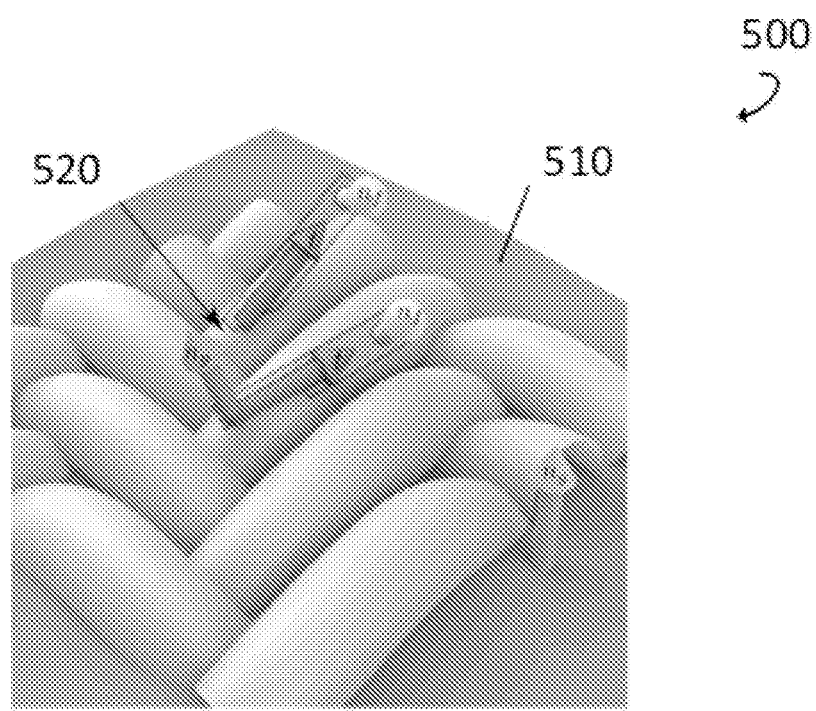
FIG. 5 illustrates a meso surface representation of the components used by the 2.5D appearance model to compute the appearance of threads according to one embodiment of the invention.

FIG. 5 illustrates a meso surface representation 500 of the components used by the 3D appearance model to compute the appearance of threads according to one embodiment of the invention. The meso surface representation 500 includes a geometric surface 510 and a yarn meso surface 520.

The geometric surface 510 is a flat 2D surface is a flat 2D surface with a normal to the geometric surface ng. The yarn meso surface 520 is a 3D illustration of threads from a 2D weave pattern, the threads entering and exiting the 2D surface. The yarn meso surface contains information about the yarn surface location and the orientation of the threads, which is used to compute the appearance of the yarn. While the yarn meso surface 520 is never created, it can be used to create the simulation output of the fabric The meso surface 520 is a geometric representation of the true surface created by the threads and fibers that compose the weave pattern. The meso surface is a 3D surface, where each point on the surface includes a normal to a yarn ny, a thread direction t, and a thread tangent direction nf. The meso surface representation 500 receives an input 2D weave pattern, and computes the effect to the 2D weave pattern on the flat geometric surface 510.

The 2.5D appearance model can model light reflected between threads because the meso surface 520 is not flat. If the surface was flat, then a reflected ray could not hit another part of the surface, but with the enhanced appearance model, the simulation output illustrates the light reflected between threads.

The system uses the repetitive nature of a given input 2D weave pattern to compute the meso surface representation

500 for the given input weave pattern. The input weave pattern is repeatedly mapped to the underlying CAD geometry and each location of the CAD geometry identifies a unique position within the weave pattern. Given this location, the system computes height and fiber orientation, and then applies a fiber shading model to compute the intensity of the reflected light from the given fiber for any given incoming lighting distribution.

The meso surface is only computed for the specific weave pattern, that is, the meso surface is not computed for the full CAD geometry onto which the weave pattern is applied, which is important. A key insight is that the weave pattern is repeated over the surface many times. It is generally too computationally intensive and often even impossible to represent the full fiber geometry over the entire CAD geometry. In contrast, the system's pre-computation of the meso surface structure is compact and efficient to represent.

Further, the system leverages the 3D information contained in the pre-computed meso structure to compute accurate shadowing of threads onto each other. For lighting, the system can use three methods. One method simply relies on the computed height value and uses a linear interpolation between in shadow for the lowest point and fully lit for the highest point on the surface. This is a fast calculation that works well due to the organized layout of the threads. A second method uses ray tracing within just the pre-computed meso surface to check if any other parts of the local surface block the light. A third method uses a functional basis such as spherical harmonics to represent the local shadowing within the weave pattern. This functional basis can be pre-computed and stored for fast lookup later.

Figure 6:
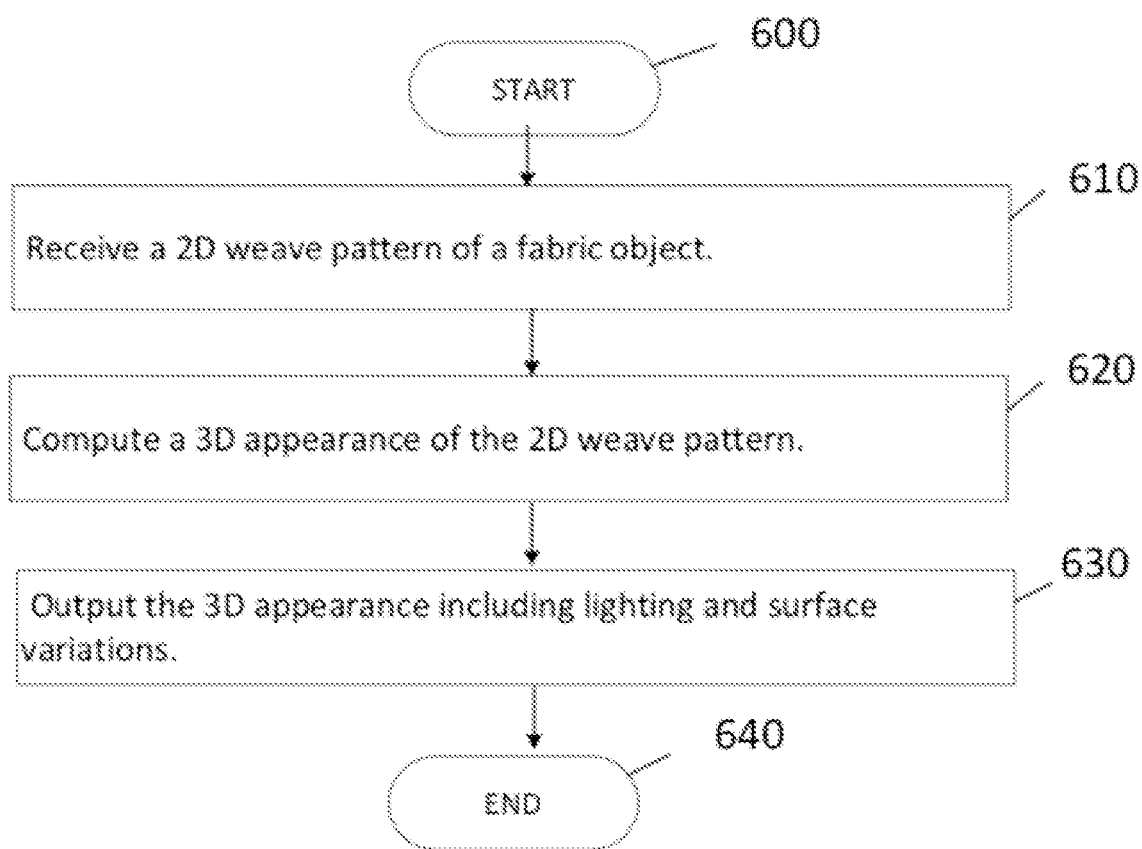
FIG. 6 illustrates a flow chart showing a process for computing the appearance of a weave pattern.

FIG. 6 illustrates a flow chart showing a process for computing the appearance of a weave pattern. The process starts at step 600. At step 610, the system receives a 2D weave pattern, such as 2D weave patterns 110, 210, of a fabric object, such as clothes or a blanket. Next, at step 620, the 3D appearance model computes a 3D appearance of the 2D weave pattern of the fabric object. At step 630, the system outputs the 3D appearance of the fabric object including lighting and surface variation, such as light reflection information and geometric surface variations of the fabric, such as simulation outputs 130, 230, 300, and 400. The process ends at step 640.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

It should be understood that the invention is not limited to the embodiments set forth herein for purposes of exemplification, but is to be defined only by a fair reading of the appended claims, including the full range of equivalency to which each element thereof is entitled. Although the invention has been described with reference to the above examples, it will be understood that modifications and variations are encompassed within the spirit and scope of the invention. Accordingly, the invention is limited only by the following claims.

One or more implementations of the systems and methods presented herein may be configured to take as an input one or more of a 2D weave pattern and/or a 2D or 3D knit pattern of a textile containing information about the organization of the threads within the weave and/or knit pattern, and/or other information. One or more implementations of the systems and methods presented herein may be configured to create a ply-level geometric representation of the weave and/or knit pattern. The ply-level geometry may be enhanced with information from the fibers making up each ply-yarn. The input may further include a 3D cad surface along which the ply-geometry is created. Additional input may comprise appearance information and/or other information. The appearance information may include values of one or more appearance parameters for a textile. The values of the one or more appearance parameters may include one or more of color, index of refraction, yarn roughness, and/or other information. The output may include the ability to simulate how light would interact with the yarn surface. This enables the creation of photorealistic images of a textile made from the given specified weave or knit.

Computing the appearance of a given object (e.g., a textile) may require solving how light interacts with the object. Interaction of light with an object may be described by a rendering equation (FIG. 7), which describes how much light is reflected and/or transmitted form a point, x, on a surface in a 3D scene. The light, or more precisely radiance, L, may be computed as the sum of the emitted light, Le, at the point and the reflected light. The reflected light may be the integral of the product of the incoming light, Li, multiplied by the BSDF, fr, or Bidirectional Scattering Distribution Function. The incoming direction, w, and the outgoing direction, w' along with the surface normal, n, may be used by the BSDF to compute the amount of light reflected. The rendering equation is shown in FIG. 7.

The rendering equation (FIG. 7) may be solved using ray tracing and/or other techniques. In ray tracing, a ray may be intersected with the surface geometry. The intersection includes a hit position and the normal at the hit position. The geometry intersected by the ray has appearance information represented as a BSDF model. The BSDF model takes into account the normal at the point of intersection and it describes how incoming light is reflected at the given surface location. BSDF models may account for diffuse and specular reflections as well as diffuse and specular transmissions. The ray tracing algorithm proceeds by tracing additional rays to compute the incoming light both from the light sources in the scene and from other geometry visible from the intersected point. This process repeats recursively to compute the effect of multiple light reflections in the scene. Typical algorithms that use ray tracing to solve the rendering equation are path tracing and photon mapping.

Figures 7, 8:
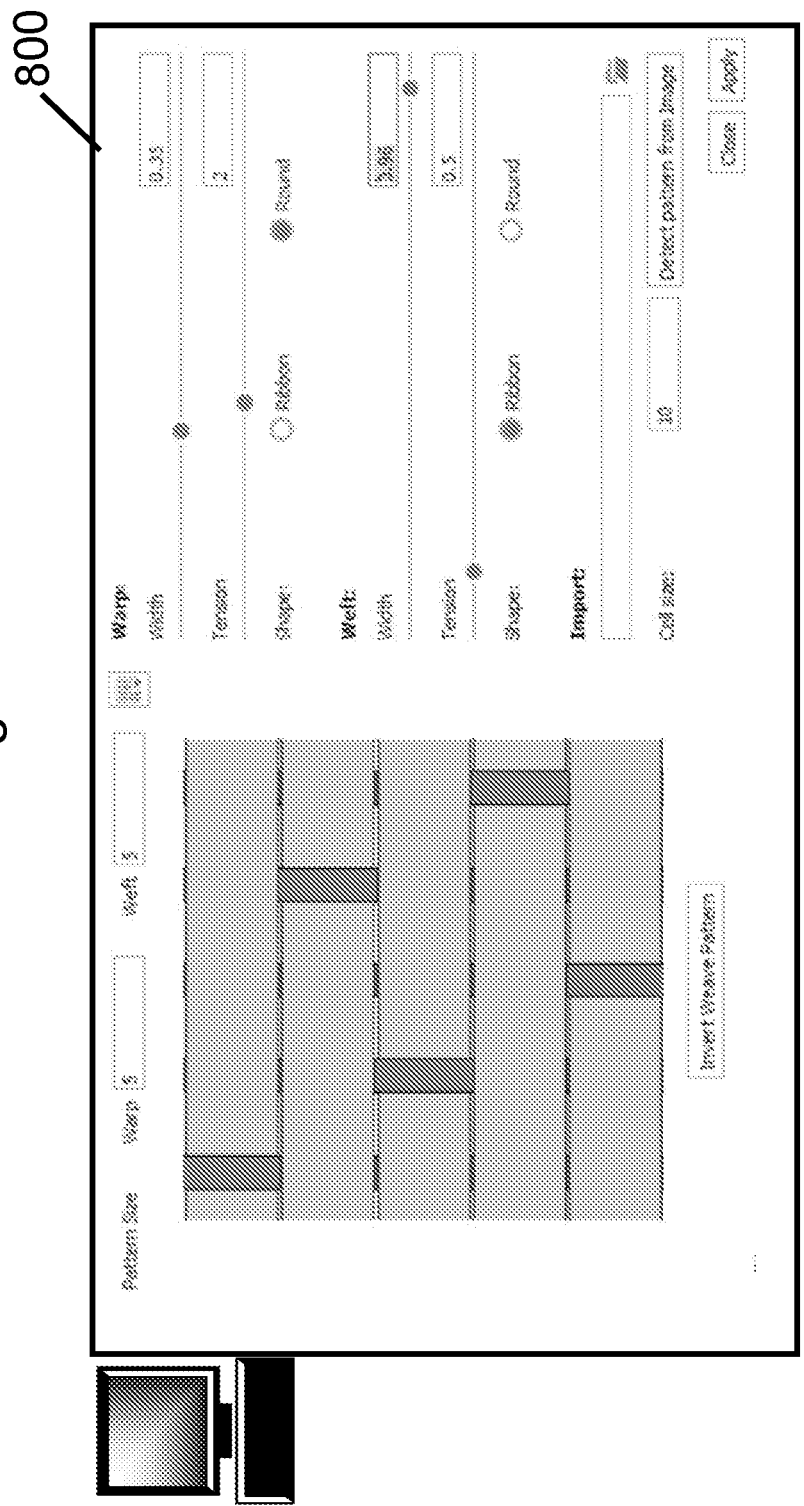
FIG. 7 shows a rendering equation, in accordance with one or more implementations.
FIG. 8 illustrates an input system for a weave or knit pattern.

FIG. 8 shows a user interface 800 for entering information about a specific weave pattern. The user interface may include one or more user interface portions. Individual portions may include one or more user interface elements configured to facilitate user interaction with the user interface. By way of non-limiting illustration, user interface elements may include one or more of text input field, drop down menus, check boxes, display windows, virtual buttons, sliding scales, and/or other elements configured to facilitate user interaction. One or more user interface elements may be configured to obtain user input about warp and weft threads. One or more user interface elements may be configured to receive user input to specify the warp and weft threads as either over or under each other. One or more user interface elements may facilitate editing of the weave pattern. The user input may also comprise entry and/or selection of information about the width and/or the tension of the warp and weft threads. Furthermore, the user input may comprise one or more of ply count and/or information of whether a ply thread is flat or round. The information for knit patterns may be similar to the weave pattern except it may include information about a specific knot type (such as knit or purl) at the given location. Additionally, the knits may be specified as being in layers to represent a multi-layered knitted textile.

Once the weave or knit pattern is specified (e.g., the input pattern as shown in FIG. 10a), a ply curve geometry may be determined. To determine a ply curve geometry, a center line of individual yarn curves (e.g., a yarn curve layout) may be computed. One approach to computing the yarn curve layout may be to provide a simple linear curve that full-fills the over and under constraints and the connectivity constraints given by the input pattern. Computing the yarn curve layout may provide an initial layout. This initial layout may be enhanced (e.g., modified, changed, and/or specified in other ways) using a standard physics relaxation procedure. The initial layout may be enhanced by the standard physics relaxation procedure by taking a tension of the curve into account and/or computing a rest state of the yarn curves. The relaxation procedure may give a more natural look for the curves and may produce a 3D yarn curve layout of the input pattern. The 3D yarn curve layout of a given pattern may be computed at the size of the given input pattern and/or at other sizes. The 3D yarn curve layout of a given pattern computed at the size of a given input pattern is shown in FIG. 10b.

Once the 3D yarn curve layout is computed, individual ones of the curve center lines may be used to create the ply-level geometry, such that the plys may be rotate around each other in a spiral (or other formation) around the center lines. The rate of rotation may be specified as user input as a value of a rate of rotation parameter. The ply count may be input as an integer number. The result of creating the ply-level geometry is shown in FIG. 10c.

Ply curve geometry may be enhanced (e.g., modified, changed, and/or specified in other ways) using fiber details from the fibers that make up the individual plys. The enhanced information (e.g., fiber details) may include shadows that may be precomputed by having one representative fiber model for the ply (see, e.g., FIG. 9) and/or other information. For this fiber model, a 1D or 2D texture map may be created by sampling points around a fiber curve. The sampling points may be found by tracing a ray from an outside location towards the center of a ply fiber bundle. At the intersection location, one or more rays may be traced in random directions, and the number of rays that do not intersect any other fiber may be used to compute the overall shadowing of the intersection location, as shown in FIG. 9b. At individual intersection locations, the fiber normal may be computed and/or stored in either a 1D or a 2D texture map (FIG. 9b). The 1D texture map may represent just one rotation around a ply curve. The 2D texture map may represent both a rotation around the ply curve and along the curve. The 2D texture map may be used to represent migration, where the fiber pattern may not be assumed to be rotationally symmetric along the ply curve. If a 1D texture map is used, the fibers in the ply curve may be assumed to be rotationally symmetric and their use may be controlled via a rotation along the length of the ply curve. The fiber detail addition is shown in FIG. 10d.

Given the ply-level geometry, flyaways may be added as small fiber curve geometry that escape the ply curve. The origin and/or the flyaway curve may be at a surface of the ply-curve geometry. In some implementations, the flyaway geometry of the flyaway may be specified by a user as user input. In some implementations, the flyaway geometry of a flyaway may generally be aligned with a ply tangent direction initially, and then specified to curve upwards. In some implementations, the shape of the flyaway may be jagged to simulate a worn appearance. An appearance showing flyaway is illustrated in FIG. 10e.

FIGS. 11a and 11b illustrate how the appearance of a given ply-curve may be computed. The BSDF model may include both reflected and transmitted light. The reflected light (FIG. 11a) may be computed as a sum of specular reflected light and diffuse reflected light. The specular reflected light may use a standard micro facet model to compute how light from a rough surface. The user may input a surface roughness, which changes how glossy and/or smooth the ply thread appears. The diffuse reflection represents light scattered due to multiple scattering within the fibers and it may be reflected in all directions. The diffuse reflection model can be one or more of a Lambertian model, the Lommel-Seeliger model, a subsurface scattering model, and/or other diffuse reflection model. The user may input a color of the diffuse reflected light as well as a strength of the light. The user may input an index of refraction that can be used to control the amount of reflected and/or transmitted light.

FIGS. 11a and 1 b further illustrate how transmitted light through a ply-curve can be computed as the sum of a specular transmission and a diffuse transmission. The specular transmission represents light that is scattered only a few times by the fibers, and it may be computed using a specular micro facet model for refraction. The user may input the roughness of the specular transmission. The diffuse transmission represents light that is scattered many times by the fibers, and it can be computed using a diffuse transmission model such as the Lambertian model. The user may input the color of the transmitted diffuse lighting. The amount of transmitted diffuse and specular transmitted light may also be specified by user input.

FIG. 11a illustrates how the light reflection model is applied to a round ply. For a round ply, the ray tracing algorithm may intersect the round ply geometry and/or compute the diffuse reflection and specular reflection. For the transmitted light, a ray is traced through the ply with a direction that can be computed using the index of refraction). When the ray intersects the backside of the round ply the diffuse transmission and specular transmission is computed.

FIG. 11a further illustrates how the ray is transmitted inside the round ply. The distance that the ray is within the round ply can be used to compute how much light is absorbed inside the ply. This can be done using, for example, Beers law for light absorption. The user may provide input specifying an amount of absorption.

FIG. 11b illustrates how the light reflection model is applied to a flat ply. For a flat ply, the ray intersects the ply surface. At the location of intersection, the diffuse reflected and specular reflected light may be computed. The flat ply can have a backside and if it does then a transmitted ray is traced straight through the flat ply to intersect the backside. At the backside intersection the diffuse transmitted and specular transmitted light may be computed. If the flat ply is made of one surface, then the transmitted light may be computed directly at the intersection point between the flat ply and the ray.

FIG. 11b illustrates how absorption may be computed inside a flat ply. If the flat ply has a backside, the absorption may be computed based on the thickness of the ply. If the flat ply is one surface then a virtual thickness can be used to compute the distance a ray would be inside the flat fly and this distance can be used to compute the absorption. Beers law may be used to compute the absorption. The amount of absorption may be input by a user.

Figure 12:
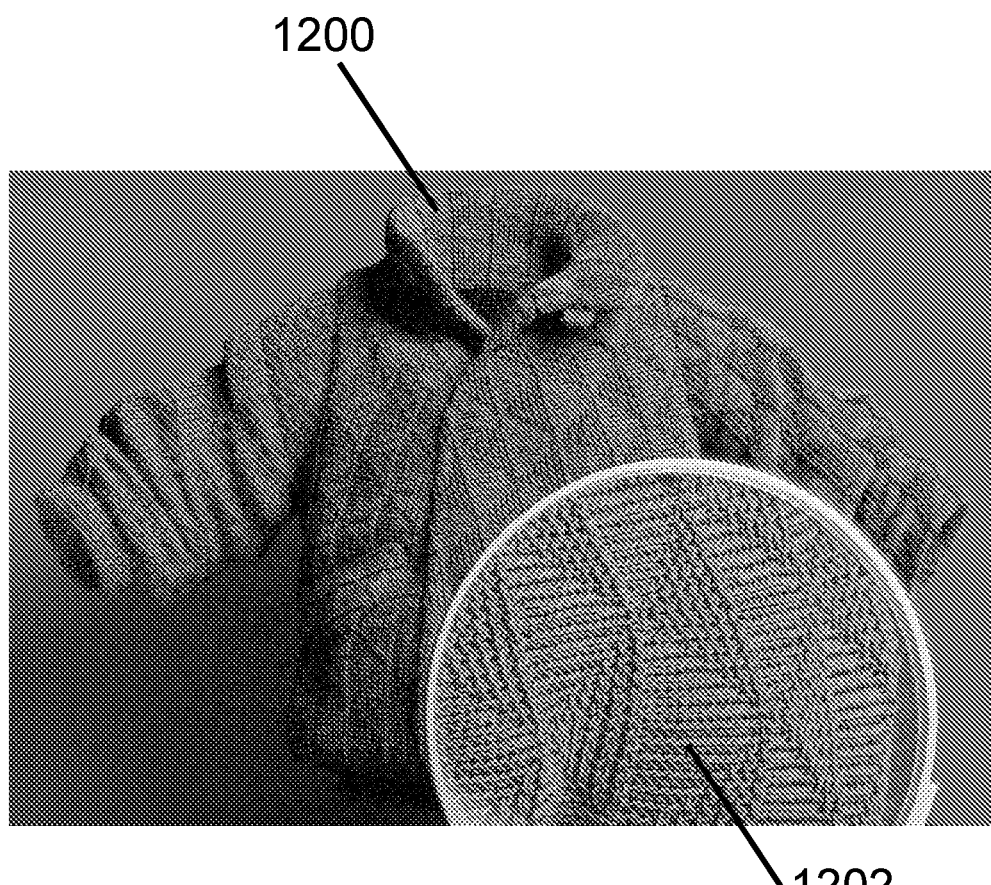
FIG. 12 shows a knit pattern applied to a 3D CAD surface.

FIG. 12 shows how the ply-level geometry is applied over a 3D CAD surface of a sweater 1200. The input CAD surface may be comprised of one or more of non-uniform rational basis spline (NURBS), triangles, subdivision surfaces, and/or other features. The CAD surface may have a parameterization (e.g., texture coordinates) that allows indexing of a surface position using a 2D location. The weave or knit pattern of a textile may be positioned on the surface such that it repeats one or more times across the surface. The number of repetitions may be input by the user. The user can specify the scale of individual weave and/or knit patterns, and the computer may compute the layout of the pattern over the CAD surface. This may be similarly to a standard texture mapping. Once the mapping is decided, the ply-level geometry may be created directly over the surface. Individual ply patterns may be connected to the neighbor pattern to provide a consistent geometrical model of all the plys. FIG. 12 shows both the entire CAD surface (the sweater) 1200 and a close-up 1202 of the patterns in the magnifying glass in front of the sweater.

Once the geometry and/or appearance information is specified, the appearance of the textile may be computed using ray tracing, a diffuse model, a specular shading model, and/or other information. To create an image of the textile, one or more rays may be traced through individual pixels to compute individual colors of the individual pixels. Once a ray intersects the ply-geometry, the fiber details and/or the appearance information may be used to compute the amount of light reflected by the ply in a direction of the incoming ray.

In is noted that one or more features and/or functions described herein directed to a "computer" may be facilitated by one or more of one or more servers, one or more computing platforms, external resource(s), and/or other components. Server(s) may be configured to communicate with one or more computing platforms according to a client/server architecture and/or other architectures. Computing platform(s) may be configured to communicate with other computing platforms via server(s) and/or according to a peer-to-peer architecture and/or other architectures. Users may access one or more implementations of the systems and methods described herein via computing platform(s).

Server(s) may include one or more of non-transitory electronic storage, one or more processors configured by machine-readable instructions, and/or other components. Machine-readable instructions include one or more instruction components. The instruction components may include computer program components. Executing the machine-readable instructions may cause server(s) to facilitate computing appearance of woven and knitted textiles at the ply-level. The instruction components may include individual instruction components configured to execute individual features and/or functions described herein.

In some implementations, server(s) may be configured to provide remote hosting of the features and/or functions of machine-readable instructions to one or more client computing platform(s) that may be remotely located from server(s). In some implementations, one or more features and/or functions of server(s) may be attributed as local features and/or functions of computing platform(s). For example, individual computing platform(s) may include machine-readable instructions comprising the same or similar components as machine-readable instructions of server(s). The computing platform(s) may be configured to locally execute the one or more instruction components that may be the same or similar to the server(s). One or more features and/or functions of machine-readable instructions of server(s) may be provided, at least in part, as an application program that may be executed at a given computing platform.

In some implementations, one or more servers, one or more computing platforms, external resource(s), and/or other components may operatively linked via one or more electronic communication links. For example, such electronic communication links may be established, at least in part, via one or more networks. One or more networks may include the Internet and/or other networks. It will be appreciated that this is not intended to be limiting and that the scope of this disclosure includes implementations in which components of a system described herein may be operatively linked via some other communication media.

External resource(s) may include sources of information, hosts, and/or providers of information outside of the system, external entities participating with the system, and/or other resources. In some implementations, some or all of the functionality attributed herein to external resource(s) may be provided by resources included in an implementation of the systems and methods presented herein.

Server(s) may include communication lines or ports to enable the exchange of information with a network and/or computing platform(s). Server(s) may include a plurality of hardware, software, and/or firmware components operating together to provide the functionality attributed herein to server(s). For example, server(s) may be implemented by a cloud of computing platforms operating together as server(s).

Electronic storage may include electronic storage media that electronically stores information. The electronic storage media of electronic storage may include one or both of system storage that is provided integrally (i.e., substantially non-removable) with server(s) and/or removable storage that is removably connectable to server(s) via, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store software algorithms, information determined by processor(s), information received from computing platform(s), and/or other information that enables one or more implementations of the systems to function as described herein.

Processor(s) may be configured to provide information-processing capabilities in server(s). As such, processor(s) may include one or more of a digital processor, an analog processor, a digital circuit designed to process information, an analog circuit designed to process information, a state machine, and/or other mechanisms for electronically processing information. In some implementations, processor(s) may include one or more processing units. These processing units may be physically located within the same device, or processor(s) may represent processing functionality of a plurality of devices operating in coordination. The processor(s) may be configured to execute components. Processor(s) may be configured to execute components by software; hardware; firmware; some combination of software, hardware, and/or firmware; and/or other mechanisms for configuring processing capabilities on processor(s).

In implementations in which processor(s) includes multiple processing units, one or more of the computer program components may be located remotely from the other components. While computer program components are described herein as being implemented via processor(s) through machine readable instructions, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components described above is for illustrative purposes and is not intended to be limiting, as any of components may provide more or less functionality than is described. For example, one or more of components may be eliminated, and some or all of its functionality may be provided by other ones of components and/or other components. As another example, processor(s) may be configured to execute one or more additional components that may perform some or all of the functionality attributed to one of the components.

Figure 13:
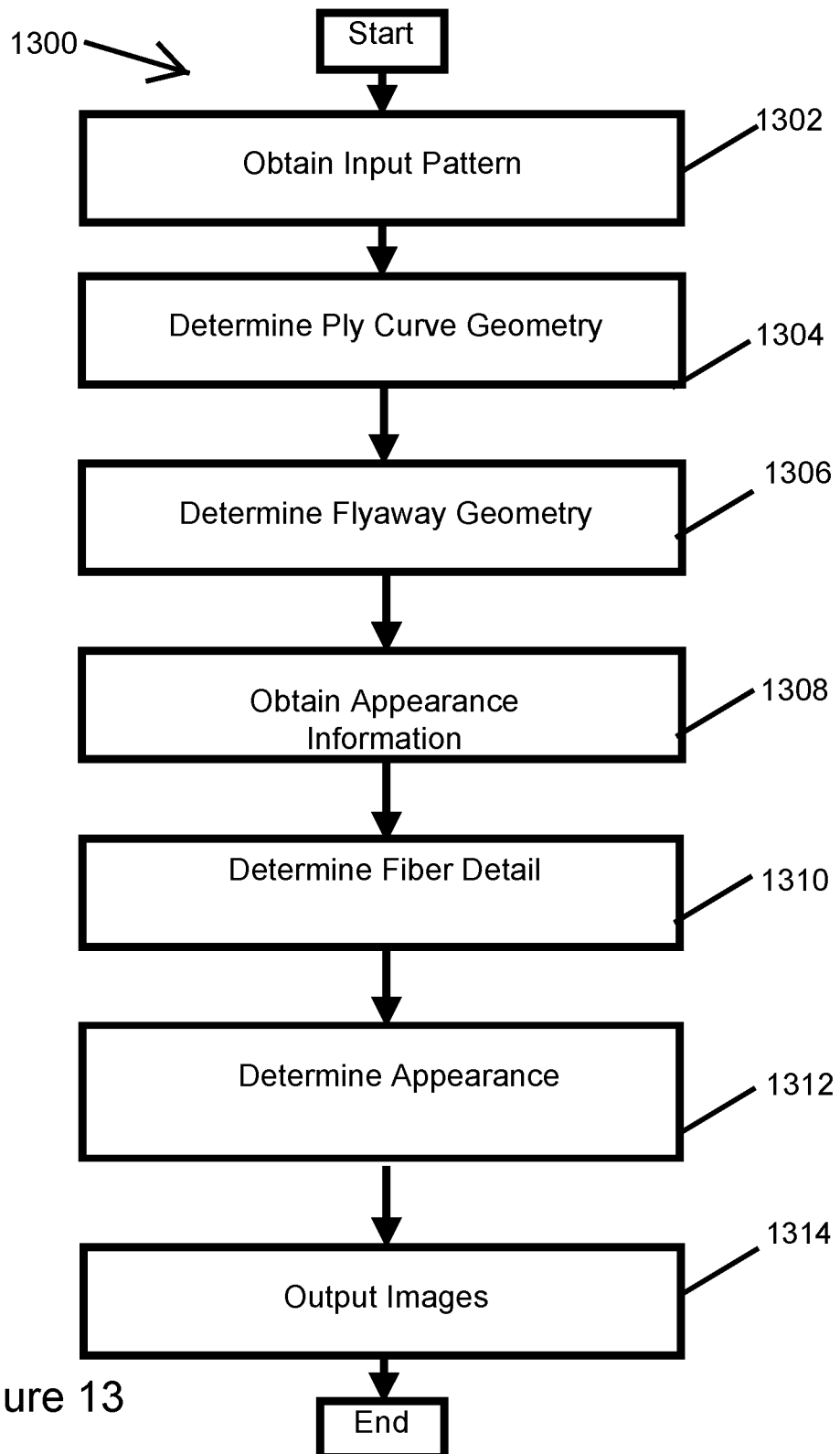
FIG. 13 illustrates a flow chart showing a method to compute the appearance of a knit or weave pattern using ply-level yarn geometry.

FIG. 13 illustrates a method 1300 to compute appearance of woven and knitted textiles at the ply-level. The operations of method 1300 presented below are intended to be illustrative. In some implementations, method 1300 may be accomplished with one or more additional operations not described, and/or without one or more of the operations discussed. Additionally, the order in which the operations of method 200 are illustrated in FIG. 13 and described below is not intended to be limiting.

In some implementations, method 1300 may be implemented in a system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 1300 in response to instructions stored electronically on electronic storage media. The one or more processing devices may include one or more devices configured through hardware, firmware, and/or software to be specifically designed for execution of one or more of the operations of method 1300.

At an operation 1302, an input pattern may be obtained. The input pattern may be obtained from user input via a user interface. The input pattern may include one or more of a 2D weave of a textile, a 2D or 3D knit pattern of a textile, and/or other information. In some implementations, operation 1302 may be performed by one or more physical processors executing an instruction component.

At an operation 1304, ply curve geometry may be determined. In some implementations, operation 1304 may be performed by one or more physical processors executing an instruction component.

At an operation 1306, flyaway geometry may be determined. In some implementations, operation 1306 may be performed by one or more physical processors executing an instruction component.

At an operation 1308, appearance information may be obtained. The appearance information may include values of one or more appearance parameters. The values of the one or more appearance parameters may include one or more of color, index of refraction, yarn roughness, and/or other information. The appearance information may be obtained from user input via a user interface. In some implementations, operation 1308 may be performed by one or more physical processors executing an instruction component.

At an operation 1310, fiber details may be computed. The fiber details may include one or more of shadowing, fiber normals, and/or other information. In some implementations, operation 1310 may be performed by one or more physical processors executing an instruction component.

At an operation 1312, appearance of the textile may be determined. The appearance may be determined using one or more of ray tracing, a diffuse model, a specular shading model, and/or other information. In some implementations, operation 1312 may be performed by one or more physical processors executing an instruction component.

At an operation 1314, one or more images depicting the appearance of the textile may be generated and/or output. One or more rays may be traced through individual pixels of an image to compute individual colors of the individual pixels. Once a ray intersects the ply-geometry, the fiber details and/or the appearance information may be used to compute the amount of light reflected by the ply in a direction of the incoming ray. In some implementations, operation 1314 may be performed by one or more physical processors executing an instruction component.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method to simulate appearance of textiles in computer-generated imagery, the method comprising:
   obtaining an input pattern comprising a two-dimensional surface representation of a weave pattern of a textile;
   determining ply curve geometry of individual plys of the weave pattern by:
      determining individual center lines of individual curves by taking a tension of the individual curves into account; and/or
      computing a rest state of the individual curves; and
   generating a two-dimensional surface model of the weave pattern that simulates a three-dimensional appearance of the weave pattern on the two-dimensional surface model based on the ply curve geometry.

2. The method of claim 1, further comprising:
computing the three-dimensional appearance of the weave pattern on the two-dimensional surface model.

3. The method of claim 1, wherein the generating the two-dimensional surface model further includes modeling one or more of specular reflections through the ply curve geometry, specular transmission through the ply curve geometry, diffuse reflections through the ply curve geometry, or diffuse transmission through the ply curve geometry.

4. The method of claim 1, further comprising:
effectuating presentation of a user interface configured to obtain user input, the user input including characterization of one or more of color, transparency, or roughness of the textile.

5. The method of claim 1, wherein the ply curve geometry specifies a round geometry.

6. The method of claim 1, wherein the ply curve geometry specifies a flat geometry.

7. The method of claim 1, further comprising:
generating flyaway geometry of flyaway fibers representing fibers breaking out from threads.

8. The method of claim 7, wherein the flyaway geometry is specified by user input, or specified as being aligned with a ply tangent direction then specified to curve outwards away from a ply center.

9. The method of claim 1, wherein the determining the ply curve geometry further comprises rotating the individual curves around the individual center lines based on a rate of rotation.

10. The method of claim 9, wherein the determining the ply curve geometry is further based on a ply count.

11. A system configured to simulate appearance of textiles in computer-generated imagery, the system comprising:
one or more physical processors configured by machine-readable instructions to:
obtain an input pattern comprising a two-dimensional surface representation of a weave pattern of a textile;
determine ply curve geometry of individual plys of the weave pattern by:
determining individual center lines of individual curves by taking a tension of the individual curves into account; and/or
computing a rest state of the individual curves; and
generate a two-dimensional surface model of the weave pattern that simulates a three-dimensional appearance of the weave pattern on the two-dimensional surface model textile based on the ply curve geometry.

12. The system of claim 11, wherein the one or more physical processors are further configured by the machine-readable instructions to:
compute the three-dimensional appearance of the weave pattern on the two-dimensional surface model.

13. The system of claim 11, wherein the one or more physical processors are further configured by the machine-readable instructions such that generating the two-dimensional surface model further includes modeling one or more of specular reflections through the ply curve geometry, specular transmission through the ply curve geometry, diffuse reflections through the ply curve geometry, or diffuse transmission through the ply curve geometry.

14. The system of claim 11, wherein the one or more physical processors are further configured by the machine-readable instructions to:
effectuate presentation of a user interface configured to obtain user input, the user input including characterization of one or more of color, transparency, or roughness of the textile.

15. The system of claim 11, wherein the ply curve geometry specifies a round geometry.

16. The system of claim 11, wherein the ply curve geometry specifies a flat geometry.

17. The system of claim 11, wherein the one or more physical processors are further configured by the machine-readable instructions to:
generate flyaway geometry of flyaway fibers representing fibers breaking out from threads.

18. The system of claim 17, wherein the flyaway geometry is specified by the user input, or specified as being aligned with a ply tangent direction then specified to curve outwards away from a ply center.

19. The system of claim 11, wherein determining the ply curve geometry further comprises rotating the individual curves around the individual center lines based on a rate of rotation.

20. The system of claim 19, wherein determining the ply curve geometry is further based on a ply count.

* * * * *